(12) United States Patent
Langue et al.

(10) Patent No.: US 7,703,492 B2
(45) Date of Patent: Apr. 27, 2010

(54) TIRE TRACTION DEVICE SECURING APPARATUS

(75) Inventors: Brian D. Langue, Hillsboro, OR (US); Eric R. Schmunk, Rainier, OR (US)

(73) Assignee: Quality Chain Corporation, Hillsboro, OR (US)

( * ) Notice: Subject to any disclaimer, the term of this patent is extended or adjusted under 35 U.S.C. 154(b) by 295 days.

(21) Appl. No.: 11/696,607

(22) Filed: Apr. 4, 2007

(65) Prior Publication Data

US 2008/0245458 A1   Oct. 9, 2008

(51) Int. Cl.
*B60C 11/00* (2006.01)
(52) U.S. Cl. ................................ 152/218; 152/221
(58) Field of Classification Search ............. 152/213 R, 152/216–218, 221; 410/96–97, 100, 115
See application file for complete search history.

(56) References Cited

U.S. PATENT DOCUMENTS

| | | | | |
|---|---|---|---|---|
| 1,131,116 | A | * | 3/1915 | Chubbuck .................... 152/218 |
| 1,234,568 | A | * | 7/1917 | Rectenwald ................. 152/218 |
| 1,284,548 | A | * | 11/1918 | Amans et al ................. 152/218 |
| 1,320,916 | A | * | 11/1919 | Randolph .................... 152/218 |
| 1,443,769 | A | * | 1/1923 | Stanley ........................ 152/218 |
| 1,494,289 | A | * | 5/1924 | Round ......................... 152/218 |
| 1,515,332 | A | * | 11/1924 | Bishop ........................ 152/218 |
| 1,748,824 | A | * | 2/1930 | Barden ........................ 152/221 |
| 1,781,651 | A | * | 11/1930 | Burkley et al. ................. 269/37 |
| 3,762,457 | A | | 10/1973 | Guethle |
| 3,902,765 | A | | 9/1975 | Kowachek et al. |
| 4,130,155 | A | | 12/1978 | Barnett et al. |
| 4,134,586 | A | * | 1/1979 | King ........................... 473/440 |
| 4,234,027 | A | | 11/1980 | Riedel |
| 4,456,233 | A | | 6/1984 | Muller |
| 4,615,368 | A | | 10/1986 | Nestlen |
| 4,832,100 | A | | 5/1989 | Herdeg |
| 4,900,204 | A | | 2/1990 | Summers |
| 4,919,182 | A | | 4/1990 | Proulx et al. |
| 5,009,256 | A | | 4/1991 | Smith |
| 5,318,087 | A | | 6/1994 | Chang Gun |
| 5,785,783 | A | | 7/1998 | Thioliere |
| 5,848,864 | A | | 12/1998 | Selby |
| 5,876,167 | A | | 3/1999 | Selby |
| 5,899,536 | A | | 5/1999 | Decker |
| 6,026,876 | A | | 2/2000 | Snyder |

(Continued)

OTHER PUBLICATIONS

Quality Chain Corporation, Detail page, tire chain adjusters, http://www.qualitychaincorp.com/accessories.php?s=3&a=misc_parts&sku=0214, printed Mar. 30, 2007, 1 page.

*Primary Examiner*—Jason R Bellinger
(74) *Attorney, Agent, or Firm*—Blakely, Sokoloff, Taylor & Zafman LLP

(57) ABSTRACT

A tire traction device securing apparatus having a plurality of elastic tensioning arms extending radially from a central hub, each of the plurality of elastic tensioning arms removably attachable to a tire traction device to provide a tension force directed toward the central hub to secure the tire traction device to the tire. In an embodiment, the plurality of arms and central hub are of an elastomeric material to form a monolithic body; coupled to each tensioning arm of the monolithic body is a hook to removably attach the tire traction device securing apparatus to the tire traction device and thereby secure the tire traction device to the tire.

22 Claims, 6 Drawing Sheets

U.S. PATENT DOCUMENTS

| | | |
|---|---|---|
| 6,035,912 A | 3/2000 | Clark |
| 6,263,554 B1 | 7/2001 | Lyne |
| 6,681,657 B2 | 1/2004 | Lyne, Jr. |
| 7,096,906 B2 | 8/2006 | Millar |
| 7,165,477 B2 | 1/2007 | Lyne, Jr. |

* cited by examiner

TIRE TRACTION DEVICE SECURING APPARATUS

BACKGROUND OF THE INVENTION

1. Field of the Invention

The present invention relates to tire traction enhancement devices for a vehicle wheel assembly. More particularly, the present invention relates to devices and methods to secure tire traction enhancement devices to a vehicle wheel assembly.

2. Discussion of Related Art

Tire traction enhancement devices, referred herein as tire traction devices, including those commonly known as tire chains, provide increased traction to a vehicle wheel assembly. When a tire of a wheel assembly provides inadequate traction for a vehicle, a tire traction device may be installed onto the tire by the operator of the vehicle and employed until road conditions improve to the point where the tire traction device becomes unnecessary. Thus, it is important that the tire traction device be simple to install and remove.

Many tire traction devices, when positioned flat on the ground, are ladder-like, having two parallel side chains connected by a plurality of transverse traction chains. The length of the side chains is generally approximately equal to the circumference of the tire, or slightly less, while the length of the traction chains is generally slightly greater than the tire tread width. While various tire traction devices may employ cables or plastic straps in place of chains, the assembly of such tire traction devices is similar to those employing chains.

To install a typical tire traction device, it is first draped over the top of the tire. The length of the traction chains is such that the side chains form a circle concentric with and adjacent to the sidewall of the tire. A tire traction device securing apparatus, such as that depicted in FIG. 1, is then attached to the side chains to remove the slack from the side and traction chains to secure the tire traction device to the tire. Conventional tire traction device securing apparatus 100 includes an elastic loop 110 and a plurality of hooks 120. The plurality of hooks 120 may be movable about the elastic loop 110 or may be crimped to elastic loop 120. To install tire traction device securing apparatus 100, each hook 120 is attached to a location on a side chain of a tire traction device. Generally, a first hook is attached, and then a second hook is selected and attached at another location on the side chain, typically a location approximately 180° from the first attached hook. With two hooks 120 attached, elastic loop 110 is stretched and distorted into a tight ellipse. After the first two hooks are installed, it is difficult to install the third hook because one must insert a hand into this tight ellipse and further stretch elastic loop 110. As hooks are attached, elastic loop 110 must stretch further and so it becomes harder to attach each successive hook 120 to the side chain. Also, after attaching the first two hooks, the thickness of the loop material becomes narrowed from the tension, and the unattached hooks become movable about the elastic loop 110 (even if initially crimped to the loop material) and must then be accurately positioned to locations on the side chain to adequately remove slack from each tire quadrant. However, because the unattached hooks cannot be moved beyond the first two attached hooks, properly securing the tire traction device to the tire requires correctly selecting first two hooks of the plurality and correctly positioning them on the side chain. For these reasons it is difficult to install traction device securing apparatus 100, especially during inclement weather.

Furthermore, because the single elastic loop 110 provides the only source of tension, conventional tire traction device securing apparatus 100 will fail to secure the tire traction device to the tire if the elastic loop 110 breaks. Hence, because a single break in loop 110 will remove all tension from each of the plurality of hooks 120, complete failure of tire traction device securing apparatus 100 may occur at any time with little or no warning.

SUMMARY OF THE INVENTION

Described herein is a tire traction device securing apparatus having a plurality of elastic tensioning arms extending from a central hub; each of the plurality of elastic tensioning arms may be removably attached to a tire traction device to provide a plurality of independent tension sources directed toward the central hub of the securing apparatus to secure the tire traction device to the tire. The plurality of elastic tensioning arms provides a plurality of independent tensioning means, easing installation and providing redundancy capable of preventing catastrophic failure. In an embodiment, the elastic tensioning arms have a greater elasticity than the central hub. In another embodiment, the elastic tensioning arms extend radially from the central hub and each arm has a length greater than the radius of the central hub. In an embodiment, each of the plurality of elastic tensioning arms has the same length and across the plurality the angle between adjacent elastic tensioning arms is equal, providing an approximately uniform tension about a circumference concentric with the central hub and slightly larger than the circumference defined by the ends of the relaxed tensioning arms opposite the central hub. In an embodiment, the arms and central hub form a monolithic body. In a particular embodiment, the monolithic body includes six elastic tensioning arms having a 60° angle between adjacent arms; each elastic tensioning arm having a breaking strength of at least 244 N. In one such embodiment, the monolithic body is of an elastomeric material, such as one comprising at least 40% natural rubber. In a further embodiment, proximate to an end of each arm opposite the central hub, a hook provides a means to removably attach a tensioning arm to the tire traction device such that the elastic tensioning arms are approximately radial to the circumference of the side chain of the tire traction device.

DETAILED DESCRIPTION OF THE PRESENT INVENTION

In various embodiments, tire traction device securing apparatuses are described with reference to figures. However, certain embodiments may be practiced without one or more of these specific details, or in combination with other known methods and materials. In the following description, numerous specific details are set forth, such as specific materials and dimensions, etc., in order to provide a thorough understanding of the present invention. In other instances, well-known aspects and features have not been described in particular detail to avoid unnecessarily obscuring the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

Figure 1:
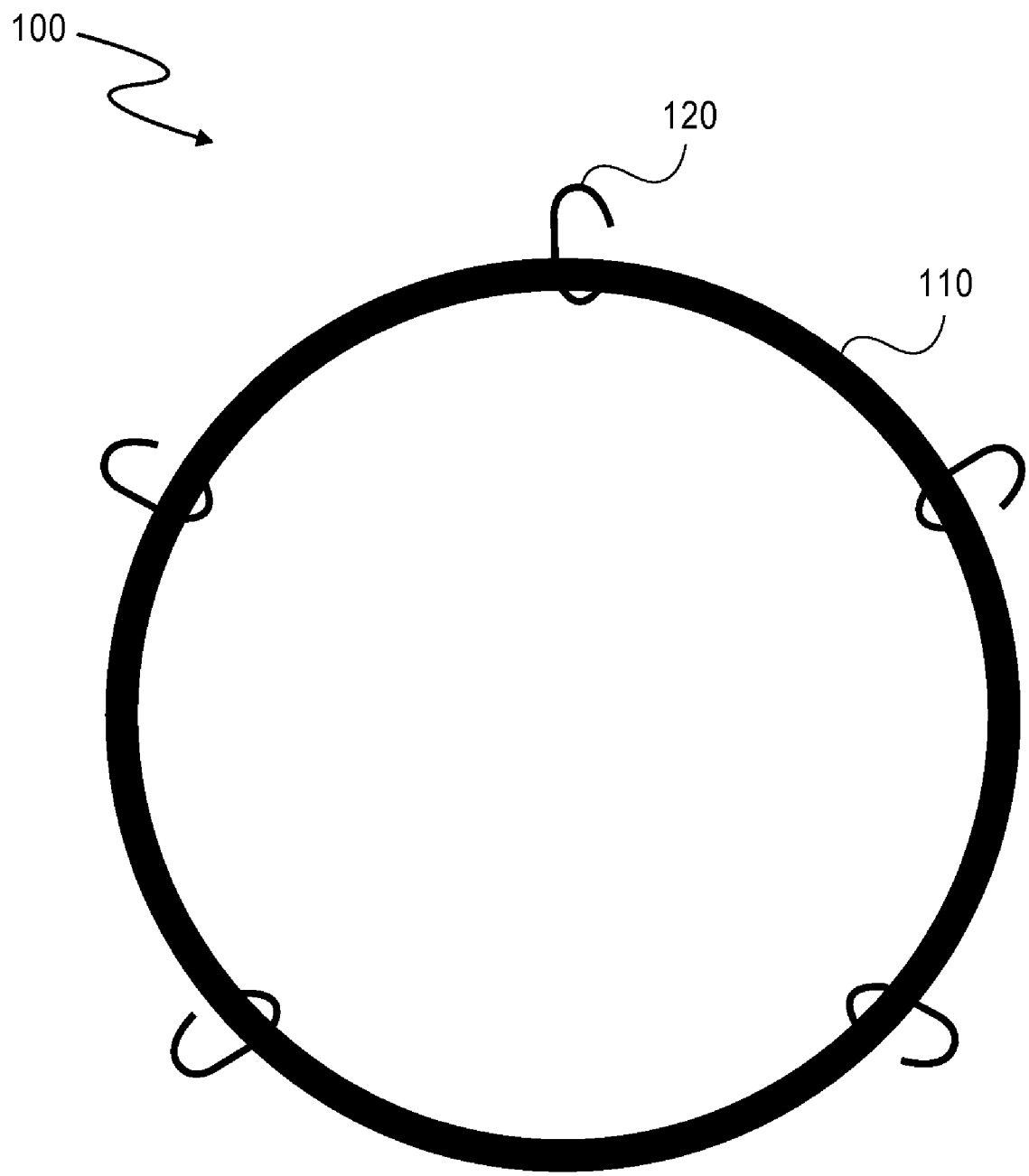
FIG. 1 depicts a conventional tire traction device securing apparatus.
Figure 2A:
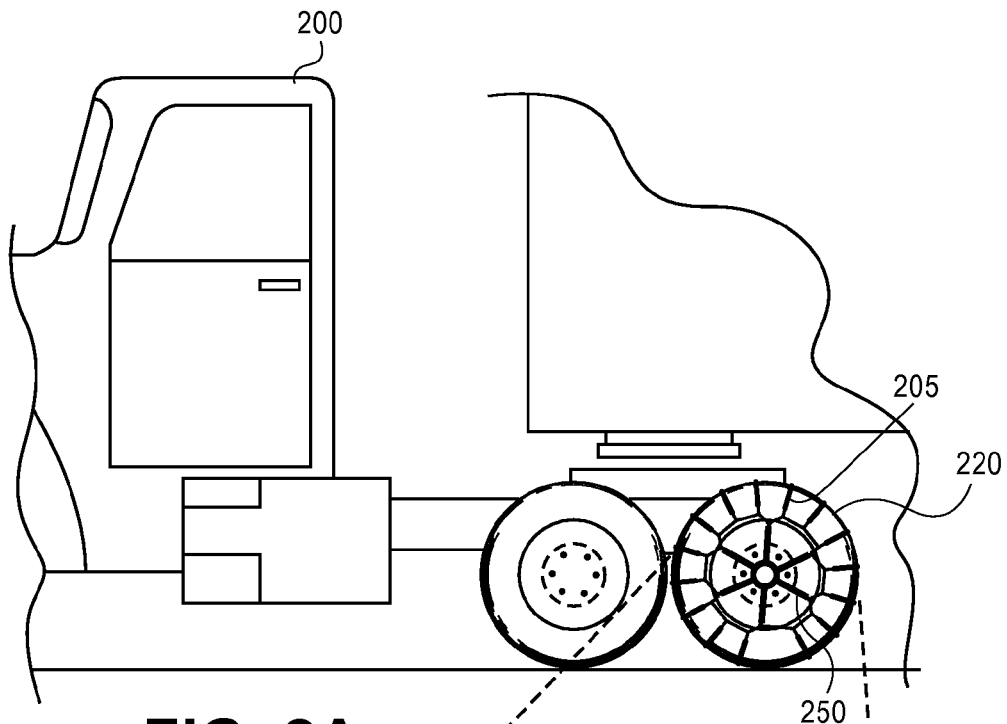
FIG. 2A depicts a vehicle with a tire traction device secured to a tire by a tire traction device securing apparatus in accordance with an embodiment of the present invention.
Figure 2B:
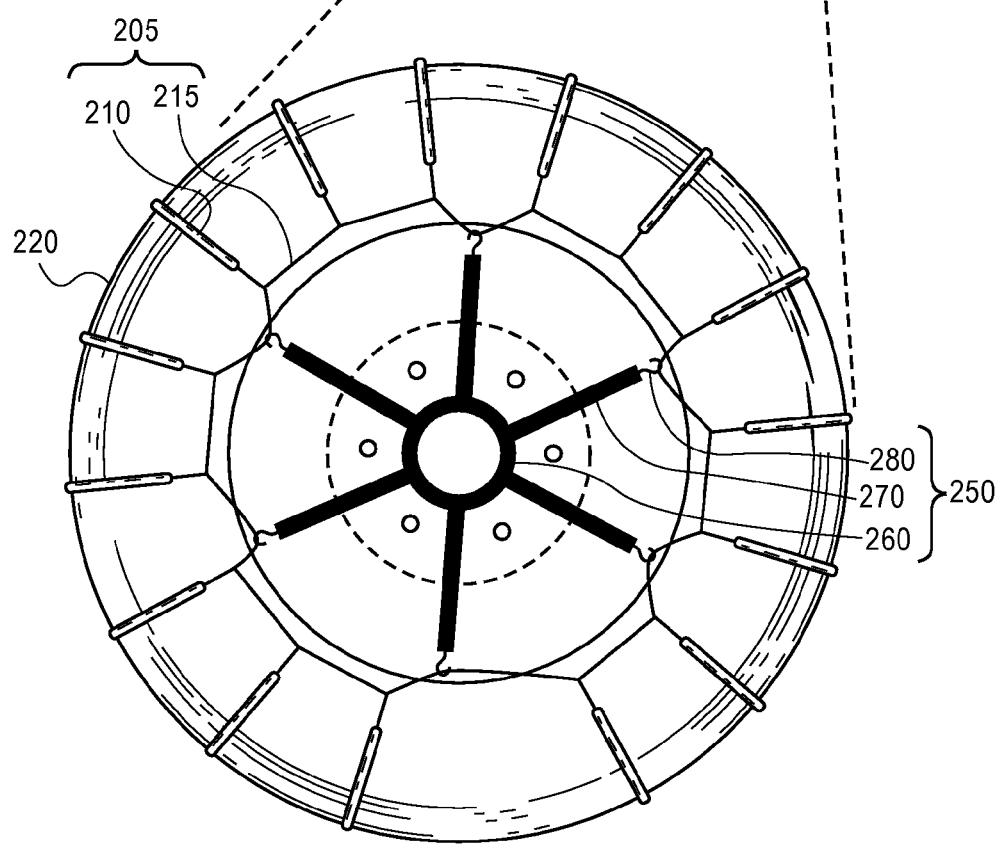
FIG. 2B depicts an expanded view of a tire traction device secured to a tire by a tire traction device securing apparatus in accordance with an embodiment of the present invention.

FIG. 2A depicts a vehicle 200 having a tire traction device 205 secured to tire 220 by a tire traction device securing apparatus 250 in accordance with an embodiment of the present invention. FIG. 2B depicts an expanded view of the wheel assembly of interest in FIG. 2A. As shown over tire 220 is tire traction device 205 including a traction chain 210 and a side chain 215. FIG. 2B further shows tire traction device securing apparatus 250 including a central hub 260, a plurality of elastic tensioning arms 270 and an attachment means 280. As shown, attachment means 280 removably attaches each elastic tensioning arm 270 to side chain 215 to provide a force directed toward central hub 260. Elastic tensioning arm 270 provides tension to tire traction device 205 proportional to the elastic deformation the arm is subjected to when tire traction device securing apparatus 250 is removably attached to tire traction device 205 on a wheel assembly (as shown in FIG. 2A-2B). When removably attached, the force of elastic tensioning arm 270 removes slack from side chain 215 and traction chain 210 to secure tire traction device 205 to tire 220.

Figure 2C:
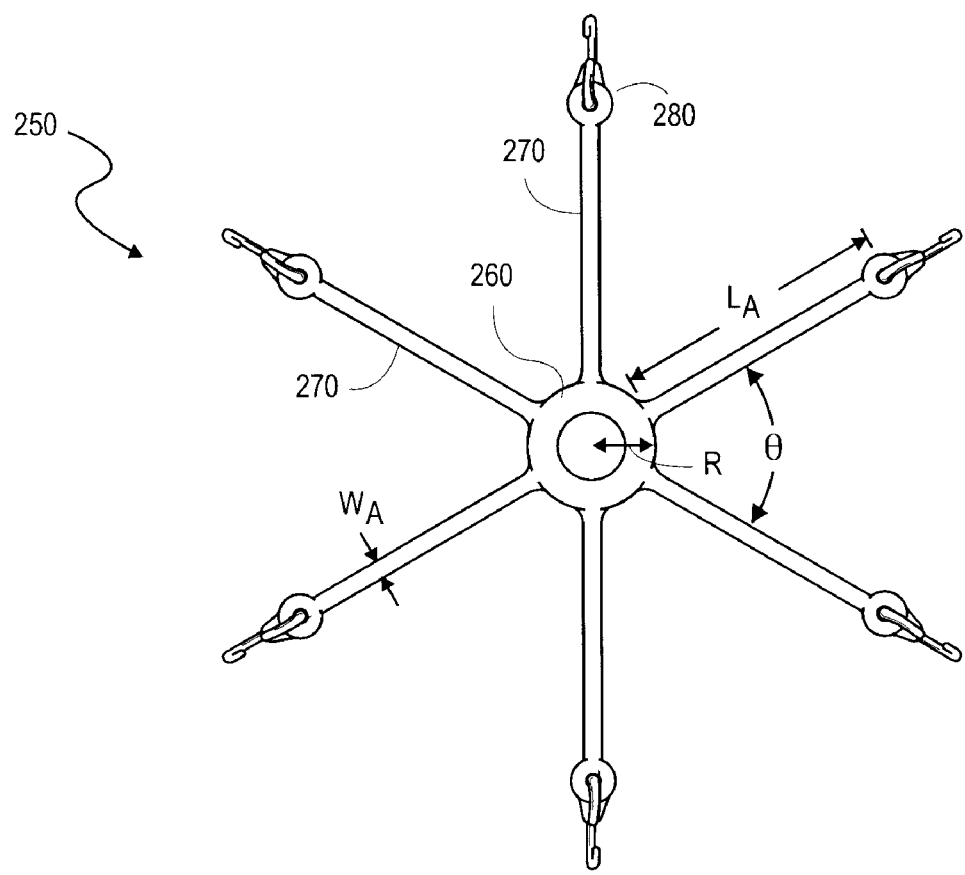
FIG. 2C is a plan view of a tire traction device securing apparatus in accordance with an embodiment of the present invention.

FIG. 2C depicts a plan view of tire traction device securing apparatus 250 in accordance with an embodiment of the present invention when it is placed flat on the ground. Generally, a plurality of elastic tensioning arms and central hub form a substantially planar hub and spoke unit. A hub and spoke unit enables easy installation and/or removal of tire traction device securing apparatus 250 because the plurality of tensioning arms have a fixed radial position. During installation, the fixed radial position dictates where on a tire traction device each arm is to be attached. When installed, a hub and spoke unit provides for uniform tension about the circumference of a tire traction device and eliminate slack from each quadrant of the tire to secure the tire traction device to a tire (as shown in FIG. 2A-2B). In the embodiment shown in FIG. 2C, the plurality of elastic tensioning arms 270 extend outward from central hub 260 to form a monolithic hub and spoke body. In an alternate embodiment, the plurality of elastic tensioning arms and central hub are separate components forming a hub and spoke assembly that can be also be manipulated as a unit during installation/removal of the tire traction device securing apparatus.

The plurality of elastic tensioning arms includes at least three elastic tensioning arms 270 to provide independent sources of tension directed toward central hub 260 about the circumference of a tire traction device on a tire. The plurality of elastic tensioning arms provides redundancy capable of preventing catastrophic failure because a failure in a single tensioning arm does not affect the ability of the remaining tensioning arms to secure the tire traction device. For instance, as few as two of the three tensioning arms may be required to secure the tire traction device to a tire and additional redundancy is provided in embodiments employing more than three tensioning arms. The at least three elastic tensioning arms also more uniformly distribute removal of slack in a tire traction device than a single, double-ended, elastic tensioning arm (e.g. a bungee cord). By more uniformly distributing the amount of slack taken up by each tensioning arm, relatively less slack must be accommodated by each arm. Therefore, each arm must provide tension over relatively less radial distance and so must be deformed relatively less during installation, thereby enabling easier installation. In an embodiment, there is an even number of elastic tensioning arms. In the specific embodiment depicted in FIG. 2C, the plurality includes six elastic tensioning arms 270. The majority of tire traction devices have between 12 and 18 side chain segments, a segment being a section of side chain between two transverse traction chains. Therefore, to provide one tensioning arm for each two or three segments, six arms are necessary. Having no more than six elastic tensioning arms also advantageously reduces the amount of labor required in attaching/removing the plurality of arms. Furthermore, embodiments with six tensioning arms provide significant tensioning arm redundancy to prevent a catastrophic failure if any tensioning arm happens to break.

The plurality of elastic tensioning arms 270 extend from central hub 260 radially. A radial configuration, as shown in FIG. 2C, transmits the tension in each elastic tensioning arm in a direction most closely approximating normal to the central hub. Radial configurations are beneficial where the joint between elastic tensioning arms 270 can withstand higher tensile stress than shear stress. Radial configurations are also beneficial in transmitting tension across the diameter of a tire traction device. This is particularly true when a first and second elastic tensioning arm 270 are on opposite sides of central hub 260 and each arm extends from the central hub in opposite directions, as discussed further below.

Generally, the plurality of elastic tensioning arms 270 may have any angular arrangement about central hub 260 to provide tension, when installed, about the circumference of a tire traction device on a tire. In a particular embodiment, the plurality of elastic tensioning arms 270 is symmetrically arranged about central hub 260. In one such embodiment, complete symmetry about the central hub is provided with an even number of tensioning arms extending radially from the central hub with a constant azimuth angle, θ, between adjacent tensioning arms. As an example of this embodiment, FIG. 2C has six elastic tensioning arms having an azimuth angle of 60° between adjacent tensioning arms. When tire traction device securing apparatus 250 is installed on a wheel assembly to secure a tire traction device (as shown in FIGS. 2A-2B), a symmetrical arrangement of tensioning arms balances the static tension in a first tensioning arm with the static tension in a second tensioning arm on an opposite side of the central hub and extending in a direction opposite the first tensioning arm (i.e. tension is balanced between two arms 280° apart). A balanced tension improves the uniformity of tension about the circumference of the tire traction device to better secure the tire traction device to a tire. A balanced tension also enables easy installation because little or no torque is imparted on central hub 260 during the attachment of elastic tensioning arms 270 to the tire traction device. Furthermore, each tensioning arm 270 provides only a portion of the total elastic deformation possible by the entire plurality of the tensioning arms. Therefore, the length across any pair of opposing tensioning arms is sufficiently small that when only one opposing pair is stretched to span the diameter of a tire traction device there is adequate tension to hold the tire traction device securing apparatus on the tire traction device while any remaining arms are attached to the tire traction device. For example, an installation may proceed by first positioning the radius of the tire traction device securing apparatus 250 parallel to the radius of the vehicle tire and adjacent to the outboard side of the tire. Next, opposing pairs of elastic tensioning arms may be successively attached to a tire traction device on the tire. Here, a first tensioning arm is attached to a tire traction device and then a second tensioning arm, extending from the central hub in a direction opposite the first, is attached to the tire traction device to impart an opposing tension in the first and second tensioning arms. This opposing tension supports the tire traction device securing apparatus while imparting no net torque as the remaining pairs of arms are attached. Removal of tire traction device securing apparatus 250 may similarly be facilitated by successively removing opposing pairs of elastic tensioning arms.

The length of each of the plurality of elastic tensioning arms 270 when relaxed, as measured from the outer diameter of central hub 260 to the attachment means is herein defined as $L_A$. In reference to FIG. 2C, the arm length, $L_A$, is measured from the outer diameter of central hub 260 to the point where elastic tensioning arm 270 couples to attachment means 280. In an embodiment, $L_A$ is equal across the plurality of elastic tensioning arms 270 to provide a uniformly distributed force. However, length, $L_A$, may vary to accommodate various tire sizes and/or tire traction device circumferences. Generally, the larger the tire, the greater the tire traction device circumference and the larger $L_A$ must be. For a given tire traction device circumference, the outer diameter of central hub 260 may be varied as well as $L_A$. However, in embodiments where the elasticity of the arms is substantially greater than the elasticity of the central hub (discussed further below), $L_A$ must be large enough that the arm can be stretched sufficiently to be attached to the tire traction device. In one embodiment, $L_A$ is less than the radius, R, of central hub 260. In another embodiment, $L_A$ is greater than the radius, R, of central hub 260. In a further embodiment, each of the plurality of elastic tensioning arms 270 has an equal length $L_A$, wherein $L_A$ is at least 10% of the radius of the tire upon which tire traction device securing apparatus is to secure a tire traction device. In a particular embodiment, central hub 260 has a radius, R, of 30 mm and $L_A$ is approximately 138 mm to secure a tire traction device to a 225 mm to 800 mm radius tire.

Generally, each elastic tensioning arm 270 may have any cross-sectional shape, such as, but not limited to, square, triangular, rectangular, oval, or circular. Elastic tensioning arm 270 may have any cross-sectional area with a width, $W_A$, which is in plane of the plan view provided in FIG. 2C, and a thickness that is out of plane of the plan view provided in FIG. 2C. The optimal cross-sectional area of the elastic tensioning arm is dependent on the elastic modulus of the particular material chosen and the desired securing tension. Both cross-sectional shape and area may vary across the plurality of elastic tensioning arm. A substantially round cross-section provides increased resistance to cuts and cracks. In a particular embodiment, each elastic tensioning arm 270 of the plurality has a substantially round cross-section having both a width, $W_A$, and a thickness of approximately 10 mm.

In an embodiment, the plurality of elastic tensioning arms 270 has a greater elasticity (smaller elastic modulus) than central hub 260. Thus, tire traction device securing apparatus 250 includes a plurality of independent, distinct regions of relatively higher elasticity (tensioning arms 270) coupled to region of relatively lower elasticity (central hub 260). Because each elastic tensioning arm 270 is distinct, there is little "pre-tensioning" of the tensioning arms during installation, thereby easing the installation of tire traction device securing apparatus 250. With substantially more elastic deformation occurring in elastic tensioning arms 270 than in central hub 260, unattached tensioning arms may remain relaxed (i.e. do not become pre-tensioned by the tension in those arms already attached) until each unattached arm is individually deformed when attached to the tire traction device.

Generally, each of the plurality of elastic tensioning arms is of a material having sufficiently large elastic modulus for the plurality to provide adequate tension to secure a tire traction device to a tire. The material preferably also has a sufficiently high breaking strength, remains sufficiently elastic across a temperature range of at least −10 C to 50 C, and is resistant to the salts and oils commonly known to exist in the typical vehicular environment. In one embodiment, the breaking strength of each elastic tensioning arm 270 is greater than 244 N (i.e. 50 lb-force tensile strength). In another embodiment, elastic tensioning arm 270 is comprised of an elastomeric material, such as but not limited to, natural rubber, silicone rubber, ethylene propylene diene rubber, polyisoprene, polybutadiene, and polyurethane. Thus, in embodiments where the plurality of elastic tensioning arms 270 and central hub 260 form a monolithic body, both the central hub and plurality of tensioning arms are comprised of an elastomeric material. In particular embodiments having monolithic elastomeric bodies, a smaller cross-sectional area of elastic tensioning arm through which tension is applied relative to that of the central hub results in each tensioning arm having smaller modulus of elasticity than that of the central hub (i.e. arms deform to a greater extent than hub). In the particular embodiment employing an elastic tensioning arm 270 having a square cross-section of approximately 10 mm on a side, the monolithic elastomeric body is comprised of at least 40% natural rubber. In an alternate embodiment wherein elastic tensioning arm 270 and central hub 260 form an assembly, elastic tensioning arm 270 may be comprised of a coil spring or elastomeric material, while hub central 260 may be comprised of any commonly known rigid material.

The central hub of the tire traction device securing apparatus may have various shapes and dimensions. In one embodiment, central hub 360 has circular shape about central axis A with a radius, R, sufficiently large that adjacent elastic tensioning arms 370 are separated from one another by a distance S. Such separation isolates tension in one arm from adjacent arms, some benefits of which were previously discussed, and also reduces the amount of shear stress at the joint between adjacent arms that could cause a tear between adjacent arms. In embodiments providing a separation between adjacent tensioning arms, the minimum outer diameter of central hub 360 depends on the number of elastic tensioning arms 270 and the width, $W_A$, of each arm. In an embodiment, the maximum radius, R, of central hub 360 is limited to half the radius of the circle defined by the end of the elastic tensioning arms 270 opposite the central hub, when the arms are relaxed. Limiting the maximum radius of the central hub advantageously keeps the hub away from the objects which may damage it, such as curbs. This is particularly important for embodiments where the central hub is shaped like a torus (discussed further below) because damage could then lead to loss of tension in multiple tensioning arms. In one embodiment employing six tensioning arms, each having a width, $W_A$, of approximately 10 mm, the radius, R, of central hub 360 is approximately 30 mm.

Figure 3:
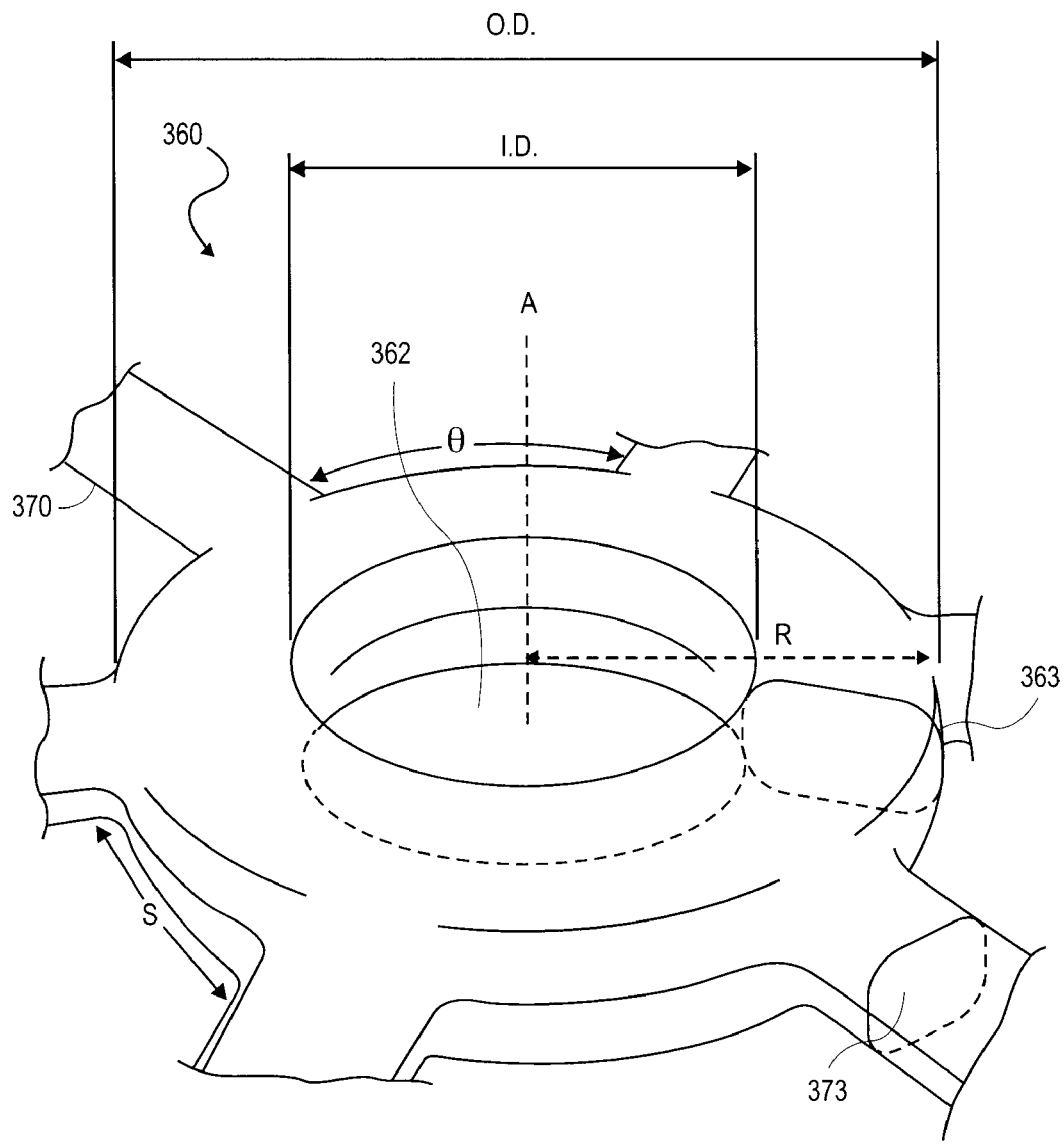
FIG. 3 is a perspective view of a central hub of a tire traction device securing apparatus in accordance with an embodiment of the present invention.

Central hub 360 may be a solid disc or, as shown in FIG. 3, central hub 360 may include at least one perforation 362.

Perforation 362 may provide elasticity to the central hub and/or provide a means restraining the plurality of tensioning arms 370 when a tire traction device securing apparatus is not securing a tire traction device to a tire (e.g. during storage of the tire traction device securing apparatus). In an embodiment, perforation 362 is sufficiently large relative to the outer radius, R, that central hub 360 has the shape of a torus, wherein the cross-sectional area 363 of the torus is approximately the same as the cross-sectional area 373 of elastic tensioning arm 370. In one such embodiment, the torus-shaped central hub has elasticity comparable to the elasticity of elastic tensioning arm 370. In the embodiment depicted in FIG. 3, a single perforation 362 forms central hub 360 into a torus having an inner diameter (I.D.) sufficiently large to contain at least three elastic tensioning arms when either inserted through perforation 362 or hooked to the torus-shaped central hub 360. In an alternate embodiment, the central hub includes a plurality of perforations, each perforation having a diameter sufficient to removably attach attachment means 280 (as shown in FIG. 2C) to the central hub when a tire traction device securing apparatus is not securing a tire traction device to a tire.

In an alternate embodiment, perforation 362 merely serves as an aesthetic feature of central hub 360. Similarly, to further increase aesthetic appeal, various aspects of the present invention may be modified. For example, a twist may also be provided along the longitudinal axis of each elastic tensioning arm 370 (not shown). Central hub 360 may also be given a pleasing appearance, such as a torus (i.e. donut) shape, a star shape, a solid disc shape, or a spherical shape. Aesthetics may further be enhanced by coloring the elastic tensioning arms and central hub. In one such embodiment, both elastic tensioning arms 270 and central hub 260 are a vivid orange.

Figure 4:
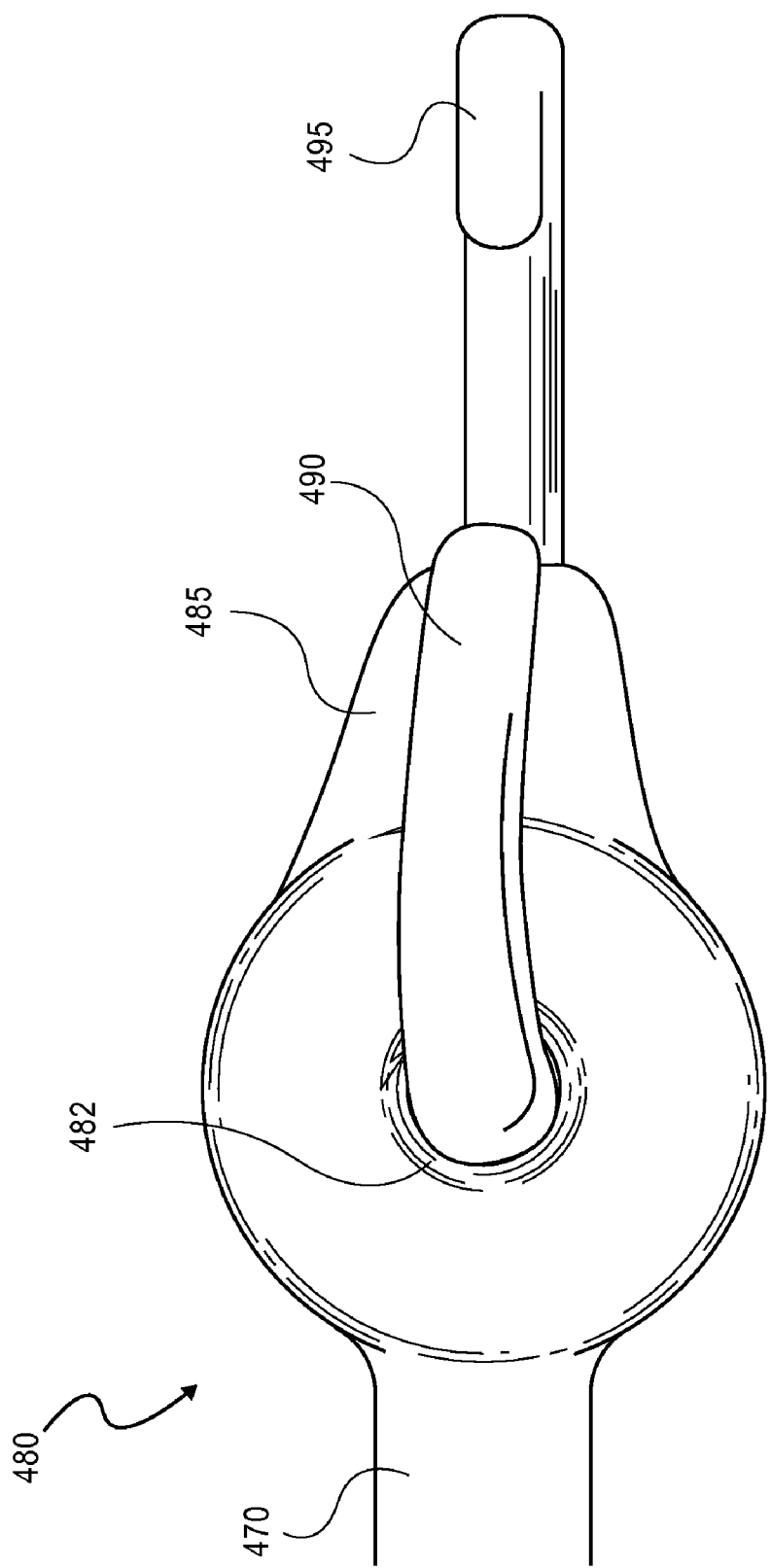
FIG. 4 is a plan view of an attachment means of a tire traction device securing apparatus in accordance with an embodiment of the present invention.
Figure 5:
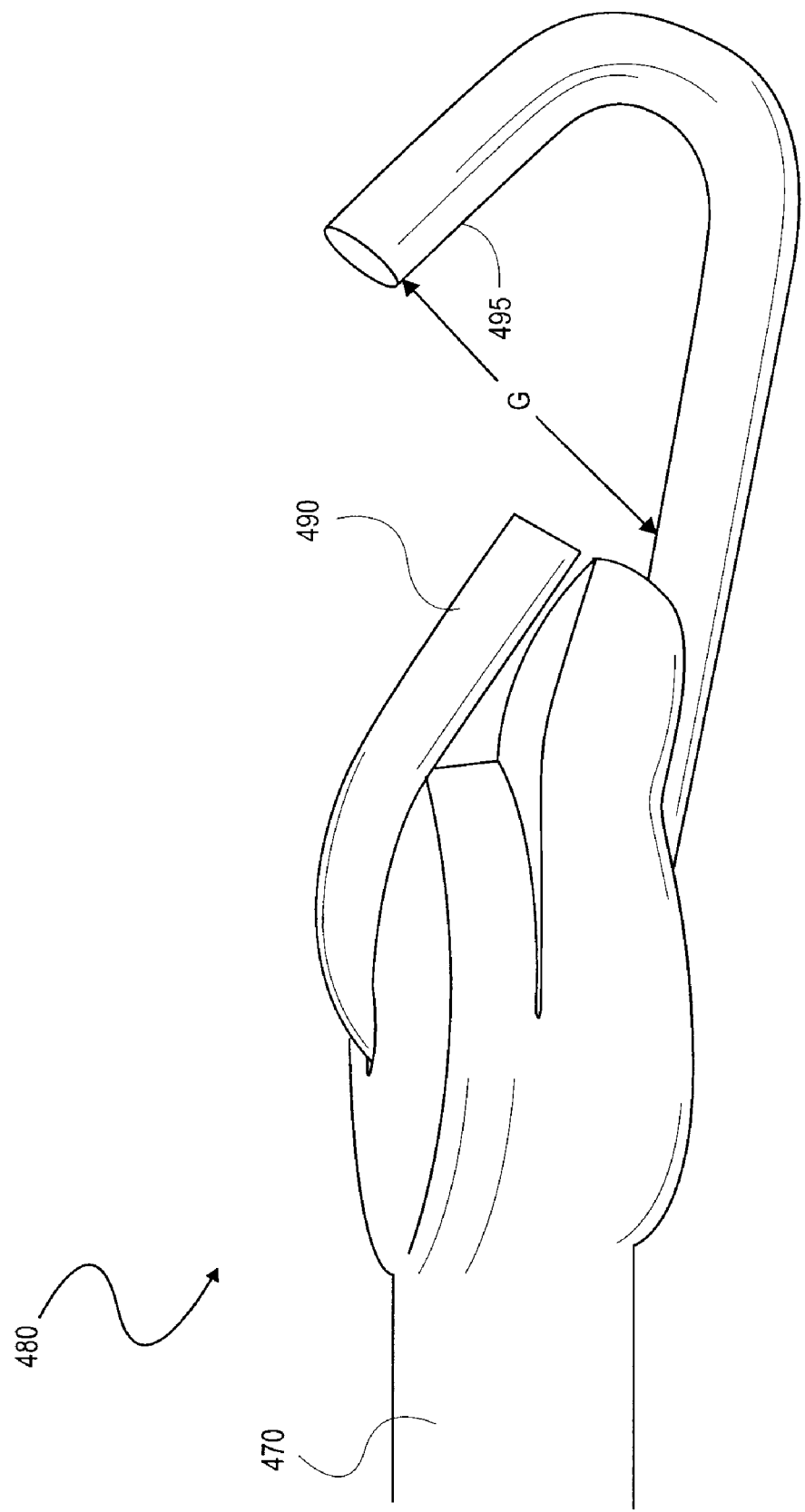
FIG. 5 is a side view of the attachment means depicted in FIG. 4.

Referring back to FIG. 2C, proximate to an end of each elastic tensioning arm 270 opposite central hub 260 is attachment means 280. Attachment means 280 serves to removably attach tire traction device securing apparatus 250 to a tire traction device on a tire (as shown in FIGS. 2A-2B). Attachment means 280 may simply comprise a perforation in elastic tensioning arm 270 to which any commonly known fastener on a tire traction device may be coupled. Alternatively, attachment means 280 further comprises a distinct material coupled to elastic tensioning arm 270, the distinct material capable of commonly known fastening modes, such as, but not limited to, hooking, snapping, or screwing, to a tire traction device. In a particular embodiment, shown in plan view in FIG. 4, attachment means 480 comprises a fastener having first end 490 passing through perforation 482 in elastic tensioning arm 470. As shown, elastic tensioning arm 470 may be locally enlarged to accommodate perforation 482 and prevent tear outs when under tension. Fastener first end 490 is crimped over end tab 485, thereby securing first end 490 to elastic tensioning arm 470. Fastener second end 495 is hooked to provide an attachment point for a tire traction device. In an embodiment, attachment means 280 comprises a fastener of a material different than that of elastic tensioning arm 470, such as metal or rigid plastic. FIG. 5 further depicts a side view of attachment means 480 showing fastener first end 490 crimped about the end of elastic tensioning arm 470 and fastener second end 495 hooked with a gap, G, of approximately 10 mm to provide an point for attaching the tire traction device securing apparatus to a tire traction device.

Although the present invention has been described in language specific to structural features and/or methodological acts, it is to be understood that the invention defined in the appended claims is not necessarily limited to the specific features or acts described. For example, many applications may benefit from the tire traction device securing apparatus in accordance with the present invention and one of ordinary skill in the art would recognize the embodiments described as particularly graceful implementations of the claimed invention useful for illustrating the present invention.

What is claimed is:

1. A tire traction device securing apparatus comprising:
   at least three elastic tensioning arms nonremovably attached to a central hub to form a hub and spoke unit, the tensioning arms extending outward radially from the central hub at a fixed radial position about the central hub; and
   a means to removably attach an end opposite the central hub of each of the at least three elastic tensioning arms to a tire traction device to provide a radial tension between the central hub and the attachment means to secure the tire traction device to a tire, wherein each of the at least three elastic tensioning arms has greater elasticity than the central hub.

2. The apparatus of claim 1, wherein each of the at least three elastic tensioning arms, when untensioned, remain at the fixed radial position about the central hub, and have a length, measured from an outer diameter of the central hub to the attachment means, that is greater than the outer diameter of the central hub.

3. The apparatus of claim 1, wherein the at least three elastic tensioning arms are of an elastomeric material containing at least one component selected from the group consisting of: natural rubber, silicone rubber, ethylene propylene diene rubber, polyisoprene, polybutadiene, and polyurethane.

4. The apparatus of claim 3, wherein the elastomeric material comprises at least 40% natural rubber.

5. The apparatus of claim 1, wherein each of the at least three elastic tensioning arms has a breaking strength of at least 244 N.

6. The apparatus of claim 1, wherein each of the at least three elastic tensioning arms and the central hub are comprised of an elastomeric material to form a monolithic hub and spoke unit.

7. The apparatus of claim 1, wherein the at least three elastic tensioning arms are of equal lengths, widths and thickness and positioned in the fixed radial position with a same angle between adjacent elastic tensioning arms to provide an approximately equal tension force between the central hub and at least three positions of a side chain on the tire traction device.

8. The apparatus of claim 7, comprising six elastic tensioning arms having a 60° angle between adjacent elastic tensioning arms.

9. The apparatus of claim 1, wherein the means to removably attach each of the at least three elastic tensioning arms to a tire traction device comprises a fastener having a first end passing through an eye proximate to the end of the tensioning arm opposite the central hub, the first end of the fastener crimped about the end of the tensioning arm, and a second end of the fastener having a hook to removably attach to the tire traction device.

10. The apparatus of claim 9, wherein the hook forms a gap between a second end of the hook and itself of at least 10 mm to removably attach to a side chain of the tire traction device.

11. The apparatus of claim 1, wherein the central hub is torus-shaped having a cross-sectional area greater than a cross-sectional area of one of the elastic tensioning arms.

12. The apparatus of claim 1, wherein each of the at least three elastic tensioning arms has a length of at least 135 mm measured from an outer diameter of the central hub to a point where the tensioning arm couples to the means to removably attach the tensioning arm to the tire traction device.

13. A tire traction device securing apparatus comprising:
   a monolithic elastomeric body having a central hub and at least three elastic tensioning arms extending outward radially from the central hub, the at least three elastic tensioning arms in a fixed radial position about the central hub with a same angle between adjacent elastic tensioning arms, wherein a portion of a surface of the central hub separates adjacent tensioning arms; and
   a fastener coupled to each of the at least three elastic tensioning arms at an end opposite the central hub, the fastener to attach the elastic tensioning arms to a tire traction device.

14. The tire traction device securing apparatus of claim 13, comprising six elastic tensioning arms.

15. The tire traction device securing apparatus of claim 13, wherein the at least three elastic tensioning arms have a greater elasticity than the central hub.

16. The tire traction device securing apparatus of claim 13, wherein the monolithic elastomeric body comprises at least 40% rubber.

17. A tire traction device securing apparatus comprising:
   a monolithic elastomeric body having a central hub and at least three elastic tensioning arms extending outward radially from the central hub, the at least three elastic tensioning arms having a constant azimuth angle between adjacent elastic tensioning arms, wherein the at least three elastic tensioning arms have a greater elasticity than the central hub; and
   a fastener coupled to each of the tensioning arms at an end opposite the central hub, the fastener to attach each elastic tensioning arm to a tire traction device.

18. The tire traction device securing apparatus of claim 17, comprising six elastic tensioning arms.

19. A tire traction device securing apparatus comprising:
   at least three elastic tensioning arms nonremovably attached to a central hub to form a hub and spoke unit, the tensioning arms extending outward radially from the central hub at a fixed radial position about the central hub; and
   a means to removably attach an end opposite the central hub of each of the at least three elastic tensioning arms to a tire traction device to provide a radial tension between the central hub and the attachment means to secure the tire traction device to a tire, wherein each of the at least three elastic tensioning arms, when untensioned, remain at the fixed radial position about the central hub, and have a length, measured from an outer diameter of the central hub to the attachment means, that is greater than the outer diameter of the central hub.

20. A tire traction device securing apparatus comprising:
   at least three elastic tensioning arms nonremovably attached to a central hub to form a hub and spoke unit, the tensioning arms extending outward radially from the central hub at a fixed radial position about the central hub; and
   a means to removably attach an end opposite the central hub of each of the at least three elastic tensioning arms to a tire traction device to provide a radial tension between the central hub and the attachment means to secure the tire traction device to a tire, wherein the central hub is torus-shaped having a cross-sectional area greater than a cross-sectional area of one of the elastic tensioning arms.

21. A tire traction device securing apparatus comprising:
   at least three elastic tensioning arms nonremovably attached to a central hub to form a hub and spoke unit, the tensioning arms extending outward radially from the central hub at a fixed radial position about the central hub; and
   a fastener to removably attach an end opposite the central hub of each of the at least three elastic tensioning arms to a tire traction device to provide a radial tension between the central hub and the fastener to secure the tire traction device to a tire, wherein each of the at least three elastic tensioning arms has greater elasticity than the central hub.

22. A tire traction device securing apparatus comprising:
   at least three elastic tensioning arms nonremovably attached to a central hub to form a hub and spoke unit, the tensioning arms extending outward radially from the central hub at a fixed radial position about the central hub; and
   a fastener to removably attach an end opposite the central hub of each of the at least three elastic tensioning arms to a tire traction device to provide a radial tension between the central hub and the fastener to secure the tire traction device to a tire, wherein each of the at least three elastic tensioning arms, when untensioned, remain at the fixed radial position about the central hub, and have a length, measured from an outer diameter of the central hub to the fastener, that is greater than the outer diameter of the central hub.

* * * * *

(12) EX PARTE REEXAMINATION CERTIFICATE (9086th)
United States Patent
Langue et al.

(10) Number: US 7,703,492 C1
(45) Certificate Issued: Jun. 19, 2012

(54) TIRE TRACTION DEVICE SECURING APPARATUS

(75) Inventors: Brian D. Langue, Hillsboro, OR (US); Eric R. Schmunk, Rainier, OR (US)

(73) Assignee: Quality Chain Corporation, Hillsboro, OR (US)

Reexamination Request:
No. 90/009,935, Aug. 11, 2011

Reexamination Certificate for:
Patent No.: 7,703,492
Issued: Apr. 27, 2010
Appl. No.: 11/696,607
Filed: Apr. 4, 2007

(51) Int. Cl.
*B60C 11/00* (2006.01)

(52) U.S. Cl. ........................................ 152/218; 152/221
(58) Field of Classification Search .................. 152/217, 152/218, 221, 222, 172, 175, 179, 184, 187, 152/189, 191, 213 A, 242
See application file for complete search history.

(56) References Cited

To view the complete listing of prior art documents cited during the proceeding for Reexamination Control Number 90/009,935, please refer to the USPTO's public Patent Application Information Retrieval (PAIR) system under the Display References tab.

*Primary Examiner* — Russell Stormer

(57) ABSTRACT

A tire traction device securing apparatus having a plurality of elastic tensioning arms extending radially from a central hub, each of the plurality of elastic tensioning arms removably attachable to a tire traction device to provide a tension force directed toward the central hub to secure the tire traction device to the tire. In an embodiment, the plurality of arms and central hub are of an elastomeric material to form a monolithic body; coupled to each tensioning arm of the monolithic body is a hook to removably attach the tire traction device securing apparatus to the tire traction device and thereby secure the tire traction device to the tire.

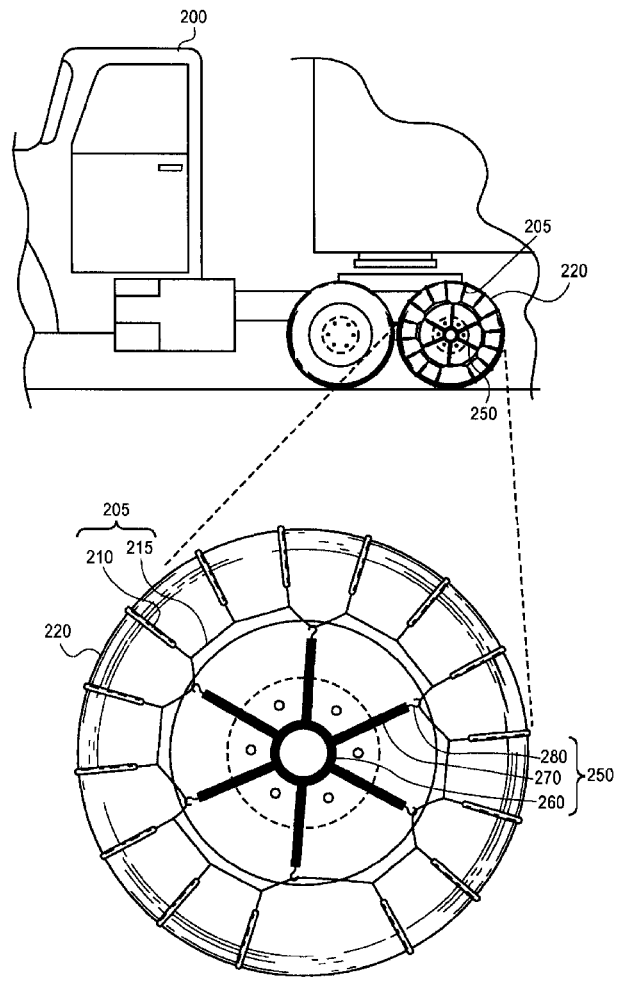

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT PRINTED HEREIN.

Column 6, lines 10-40:

Generally, each of the plurality of elastic tensioning arms is of a material having sufficiently large elastic modulus for the plurality to provide adequate tension to secure a tire traction device to a tire. The material preferably also has a sufficiently high breaking strength, remains sufficiently elastic across a temperature range of at least −10C to 50C, and is resistant to the salts and oils commonly known to exist in the typical vehicular environment. In one embodiment, the breaking strength of each elastic tensioning arm 270 is greater than 244 N (i.e. 50 lb-force tensile strength). In another embodiment, elastic tensioning arm 270 is comprised of an elastomeric material, such as but not limited to, natural rubber, silicone rubber, ethylene propylene diene rubber, polyisoprene, polybutadiene, and polyurethane. Thus, in embodiments where the plurality of elastic tensioning arms 270 and central hub 260 form a monolithic body, both the central hub and plurality of tensioning arms are comprised of an elastomeric material. In particular embodiments having monolithic elastomeric bodies, a smaller cross-sectional area of elastic tensioning arm through which tension is applied relative to that of the central hub results in each tensioning arm [having smaller modulus of elasticity than that of the central hub (i.e. arms deform] *deforming* to a greater extent than hub[)]. In the particular embodiment employing an elastic tensioning arm 270 having a square cross-section of approximately 10 mm on a side, the monolithic elastomeric body is comprised of at least 40% natural rubber. In an alternate embodiment wherein elastic tensioning arm 270 and central hub 260 form an assembly, elastic tensioning arm 270 may be comprised of a coil spring or elastomeric material, while [hub] *central hub* 260 may be comprised of any commonly known rigid material.

AS A RESULT OF REEXAMINATION, IT HAS BEEN DETERMINED THAT:

Claims 1, 6, 20 and 21 are cancelled.

Claims 2, 3, 5, 7, 9, 11-13, 15, 17, 19 and 22 are determined to be patentable as amended.

Claims 4, 8, 10, 14, 16 and 18, dependent on an amended claim, are determined to be patentable.

New claims 23-32 are added and determined to be patentable.

2. The apparatus of claim [1] *13*, wherein each of the at least three elastic tensioning arms, when untensioned, remain at the fixed radial position about the central hub, and have a length, measured from an outer diameter of the central hub to the [attachment means] *fastener*, that is greater than the outer diameter of the central hub.

3. The apparatus of claim [1] *13*, wherein the [at least three elastic tensioning arms are] *monolithic elastomeric body is* of an elastomeric material containing at least one component selected from the group consisting of: natural rubber, silicone rubber, ethylene propylene diene rubber, polyisoprene, polybutadiene, and polyurethane.

5. The apparatus of claim [1] *13*, wherein each of the at least three elastic tensioning arms has a breaking strength of at least 244 N.

7. The apparatus of claim [1] *13*, wherein the at least three elastic tensioning arms are of equal lengths, widths and thickness and positioned in the fixed radial position with a same angle between adjacent elastic tensioning arms to provide an approximately equal tension force between the central hub and at least three positions of a side chain on the tire traction device.

9. The apparatus of claim [1] *13*, wherein the [means to removably attach each of the at least three elastic tensioning arms to a tire traction device comprises a] fastener [having] *has* a first end passing through an eye proximate to the end of the tensioning arm opposite the central hub, the first end of the fastener crimped about the end of the tensioning arm, and a second end of the fastener having a hook to removably attach to the tire traction device.

11. The apparatus of claim [1] *13*, wherein the central hub is torus-shaped having a cross-sectional area greater than a cross-sectional area of one of the elastic tensioning arms.

12. The apparatus of claim [1] *13*, wherein each of the at least three elastic tensioning arms has a length of at least 135 mm measured from an outer diameter of the central hub to a point where the tensioning arm couples to the [means to removably attach the tensioning arm to the tire traction device] *fastener*.

13. A tire traction device securing apparatus comprising:
a monolithic elastomeric body having a central hub and at least three elastic tensioning arms extending outward radially from the central hub, the at least three elastic tensioning arms in a fixed radial position about the central hub with a same angle between adjacent elastic tensioning arms, wherein a *first* portion of a surface of the central hub separates adjacent tensioning arms; and
a fastener coupled to each of the at least three elastic tensioning arms at an end opposite the central hub, the fastener to attach the elastic tensioning arms to a tire traction device, *wherein a second portion of the central hub surface defines a perforation through the hub, and wherein, in response to a tension applied through the tensioning arms, the at least three elastic tensioning arms are to elastically deform to a greater extent than the central hub.*

15. The tire traction device securing apparatus of claim 13, wherein the at least three elastic tensioning arms have *at least one of:* a [greater elasticity] *smaller elastic modulus* than the central hub, *or a cross-sectional area smaller than a cross-sectional area of the central hub between the first and second portions of the central hub surfaces.*

17. A tire traction device securing apparatus comprising:
a monolithic elastomeric body having a *torus-shaped* central hub and at least three elastic tensioning arms extending outward radially from the central hub, the at least three elastic tensioning arms having a constant azimuth angle between adjacent elastic tensioning arms, wherein the at least three elastic tensioning arms have *at least one of:* a [greater elasticity] *smaller elastic modulus* than the central hub, *or a cross-sectional area smaller than a cross-sectional area of the torus*; and
a fastener coupled to each of the tensioning arms at an end opposite the central hub, the fastener to attach each elastic tensioning arm to a tire traction device.

19. A tire traction device securing apparatus comprising:
at least three elastic tensioning arms nonremovably attached to a central hub to form a hub and spoke unit, the tensioning arms extending outward radially from the central hub at a fixed radial position about the central hub; and
a means to removably attach an end opposite the central hub of each of the at least three elastic tensioning arms to a tire traction device to provide a radial tension between the central hub and the attachment means to secure the tire traction device to a tire, wherein each of the at least three elastic tensioning arms, when untensioned, remain at the fixed radial position about the central hub, and have a length, measured from an outer diameter of the central hub to the attachment means, that is greater than the outer diameter of the central hub, *wherein a portion of a surface of the central hub defines a perforation through the central hub, and wherein, in response to a tension applied through the tensioning arms, the tensioning arms are to elastically deform to a greater extent than the central hub when a tension is applied through the arms.*

22. A tire traction device securing apparatus comprising:
at least three elastic tensioning arms nonremovably attached to a central hub to form a hub and spoke unit, the tensioning arms extending outward radially from the central hub at a fixed radial position about the central hub; and
a fastener to removably attach an end opposite the central hub of each of the at least three elastic tensioning arms to a tire traction device to provide a radial tension between the central hub and the fastener to secure the tire traction device to a tire, wherein each of the at least three elastic tensioning arms, when untensioned, remain at the fixed radial position about the central hub, and have a length, measured from an outer diameter of the central hub to the fastener, that is greater than the outer diameter of the central hub, *wherein a portion of a surface the central hub defines a perforation through the central hub, and wherein, in response to a tension applied through the tensioning arms, the tensioning arms are to elastically deform to a greater extent than the central hub when a tension is applied through the arms.*

*23. The tire traction device securing apparatus of claim 13, wherein the perforation is circular about an axis centered within an outer diameter of the central hub.*

*24. The tire traction device securing apparatus of claim 23, wherein the first portion of the central hub surface is curved about an axis passing through a center of the perforation.*

*25. The tire traction device securing apparatus of claim 23, wherein the central hub is torus-shaped.*

*26. The tire traction device securing apparatus of claim 13, wherein the central hub has a cross-sectional area in a region between two adjacent tensioning arms which is equal to or greater than a transverse cross-sectional area of one of the elastic tensioning arms.*

*27. The tire traction device securing apparatus of claim 19, wherein the perforation is circular about an axis centered within an outer diameter of the central hub.*

*28. The tire traction device securing apparatus of claim 27, wherein the central hub is torus-shaped.*

*29. The tire traction device securing apparatus of claim 19, wherein the central hub has a cross-sectional area in a region between two adjacent tensioning arms which is equal to or greater than a transverse cross-sectional area of one of the elastic tensioning arms.*

*30. The tire traction device securing apparatus of claim 22, wherein the perforation is circular about an axis centered within an outer diameter of the central hub.*

*31. The tire traction device securing apparatus of claim 30, wherein the central hub is torus-shaped.*

*32. The tire traction device securing apparatus of claim 22, wherein the central hub has a cross-sectional area in a region between two adjacent tensioning arms which is equal to or greater than a transverse cross-sectional area of one of the elastic tensioning arms.*

\* \* \* \* \*